US010154087B2

(12) United States Patent
Parker et al.

(10) Patent No.: US 10,154,087 B2
(45) Date of Patent: Dec. 11, 2018

(54) DATABASE BASED REDUNDANCY IN A TELECOMMUNICATIONS NETWORK

(71) Applicant: Affirmed Networks, Inc., Acton, MA (US)

(72) Inventors: Ronald M. Parker, Boxborough, MA (US); James L. Logan, Westborough, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 155 days.

(21) Appl. No.: 15/405,505

(22) Filed: Jan. 13, 2017

(65) Prior Publication Data
US 2017/0208123 A1    Jul. 20, 2017

Related U.S. Application Data

(60) Provisional application No. 62/279,240, filed on Jan. 15, 2016.

(51) Int. Cl.
*H04L 29/08*   (2006.01)
*G06F 11/14*   (2006.01)
(Continued)

(52) U.S. Cl.
CPC ...... *H04L 67/1095* (2013.01); *G06F 11/1464* (2013.01); *G06F 11/1469* (2013.01);
(Continued)

(58) Field of Classification Search
CPC ............ G06F 11/1464; G06F 11/1469; G06F 11/2028; G06F 17/30377; G06F 17/30477;
(Continued)

(56) References Cited

U.S. PATENT DOCUMENTS

| 4,872,157 A | 10/1989 | Hemmady et al. |
| 4,872,159 A | 10/1989 | Hemmady et al. |

(Continued)

FOREIGN PATENT DOCUMENTS

| CN | 101188520 A | 5/2008 |
| CN | 102118294 A | 7/2011 |

(Continued)

OTHER PUBLICATIONS

International Search Report and Written Opinion issued by the U.S. Patent and Trademark Office as International Searching Authority, issued in International Patent Application No. PCT/US17/13303, dated Apr. 3, 2017 (9 pages).

*Primary Examiner* — Kim T Nguyen
(74) *Attorney, Agent, or Firm* — Wilmer Cutler Pickering Hale and Dorr LLP

(57) ABSTRACT

A method includes receiving network element data from a first compute instance that hosts a network element instance. The network element data includes identification and state information associated with the network element instance. The method includes creating a key based on the network element data that includes a network element identifier and a table identifier of a categorization of the state information. The network element identifier is associated with the identification information. The method includes storing the key and state information in a database and determining a failure of the first compute instance. The method includes determining a key associated with the network element identifier of the network element instance and transmitting activation data to a second compute instance. The activation data is associated with instructions to retrieve records associated with the key associated with the first network identifier including state information to recreate the first network element instance.

16 Claims, 8 Drawing Sheets

(51) Int. Cl.
*G06F 11/20* (2006.01)
*G06F 17/30* (2006.01)
*H04L 12/24* (2006.01)
*H04L 12/26* (2006.01)

(52) U.S. Cl.
CPC .... *G06F 11/2028* (2013.01); *G06F 17/30377* (2013.01); *G06F 17/30477* (2013.01); *H04L 41/0668* (2013.01); *H04L 41/0672* (2013.01); *H04L 43/10* (2013.01)

(58) Field of Classification Search
CPC . H04L 41/0672; H04L 67/1095; H04L 43/10; H04L 41/0668
See application file for complete search history.

(56) References Cited

U.S. PATENT DOCUMENTS

| | | |
|---|---|---|
| 4,872,160 A | 10/1989 | Hemmady et al. |
| 4,875,206 A | 10/1989 | Nichols et al. |
| 4,894,824 A | 1/1990 | Hemmady et al. |
| 4,896,319 A | 1/1990 | Lidinsky et al. |
| 4,897,874 A | 1/1990 | Lidinsky et al. |
| 4,899,333 A | 2/1990 | Roediger |
| 4,922,486 A | 5/1990 | Lidinsky et al. |
| 4,942,574 A | 7/1990 | Zelle |
| 4,958,341 A | 9/1990 | Hemmady et al. |
| 4,977,582 A | 12/1990 | Nichols et al. |
| 7,483,995 B2 | 1/2009 | Abhishek et al. |
| 7,596,369 B2 | 9/2009 | Alperin et al. |
| 8,085,808 B2 | 12/2011 | Brusca et al. |
| 8,102,813 B2 | 1/2012 | Abhishek et al. |
| 8,364,633 B2 | 1/2013 | Aahlad et al. |
| 8,515,488 B2 | 8/2013 | Hillier et al. |
| 8,799,512 B2 | 8/2014 | Alperin et al. |
| 9,417,897 B1 | 8/2016 | Klompje et al. |
| 2003/0208609 A1 | 11/2003 | Brusca |
| 2006/0183469 A1 | 8/2006 | Gadson |
| 2008/0140726 A1 | 6/2008 | Aahlad et al. |
| 2009/0116381 A1 | 5/2009 | Kanda |
| 2011/0047612 A1 | 2/2011 | D'ambrosio et al. |
| 2012/0309383 A1 | 12/2012 | Van Phan et al. |
| 2012/0323703 A1 | 12/2012 | Hillier |
| 2013/0007753 A1* | 1/2013 | Jain .......... G06F 9/46 718/103 |
| 2013/0159723 A1* | 6/2013 | Brandt ........ G06F 21/6218 713/176 |
| 2013/0268643 A1 | 10/2013 | Chang et al. |
| 2014/0188971 A1 | 7/2014 | Aahlad et al. |
| 2014/0189004 A1 | 7/2014 | Aahlad et al. |
| 2015/0135255 A1 | 5/2015 | Theimer et al. |
| 2016/0044130 A1* | 2/2016 | Packham ........ G06F 17/30902 709/213 |
| 2016/0182473 A1 | 6/2016 | Cignetti et al. |

FOREIGN PATENT DOCUMENTS

| | | |
|---|---|---|
| CN | 102567080 A | 7/2012 |
| CN | 103346924 A | 10/2013 |
| CN | 103986665 A | 8/2014 |
| CN | 103648088 B | 10/2016 |
| WO | WO-2007062573 A1 | 6/2007 |
| WO | WO-2014124558 A1 | 8/2014 |

* cited by examiner

DATABASE BASED REDUNDANCY IN A TELECOMMUNICATIONS NETWORK

CROSS REFERENCE TO RELATED APPLICATIONS

The present application claims priority to U.S. Provisional Application No. 62/279,240, filed Jan. 15, 2016, titled "Database Based Redundancy in a Telecommunications Network," incorporated herein by reference.

TECHNICAL FIELD

The present disclosure is related to the field of telecommunications, and more specifically to techniques of using databases for redundancy in a telecommunications network.

BACKGROUND

In a traditional approach for achieving highly available and redundant telecommunication applications, the number of compute elements (e.g., virtual machines (VMs) or hosts) is at least N+1 and sometimes 2N, in order to allow synchronization of state from a primary to a secondary compute instance. The required memory, in totality, is 2N, since every important state must be replicated in memory at a second location. In order to accomplish this solution, code must be written and tested to push state from the primary compute instance, and install it at the secondary computer instances. CPU cycles are expended in this process, thereby reducing the maximal rate at which the system could otherwise handle transactions. Ultimately, a slower and less available system results due to the efforts to add redundancy.

SUMMARY

In one aspect of the invention, a method of and system for providing database-based redundancy in a telecommunications network is provided.

In another aspect of the invention, a computerized method for providing database-based redundancy in a telecommunications network includes receiving, by a computing system, network element data from a first compute instance. The first compute instance hosts at least a portion of a network element instance. The network element data includes identification information and state information associated with the network element instance. The method also includes creating, by the computing system, a composite key based on the network element data. The composite key includes a network element identifier (ID) and a table ID associated with a categorization of the state information. The network element ID is associated with the identification information. The method also includes storing, by the computing device, the composite key and associated state information as records in a database associated with the computing device and determining, by the computing system, a failure associated with the first compute instance. The method further includes determining, by the computing system, a distribution key associated with the network element ID associated with the network element instance and transmitting, by the computing system, activation data to a second compute instance. The activation data is associated with instructions to retrieve, from the database, records associated with the distribution key associated with the first network ID including state information to recreate the first network element instance on the second compute instance.

Under an embodiment of the invention, the method further includes transmitting, by the computing system, write request data to the compute instance. The write request data is associated with instructions to write the network element data to a database.

Under an embodiment of the invention, the composite key further includes a table row key and/or a compute instance ID. The table row key is associated with the state information corresponding to the table ID and the network element ID. The compute instance ID is associated with a compute instance hosting the network element instance.

Under an embodiment of the invention, the distribution key further includes at least one of a virtual machine ID and a table ID.

Under an embodiment of the invention, the computing system and the compute instance are located in a first data center.

Under an embodiment of the invention, the computing system is located in a first data center, and the compute instance is located in a second data center. The first data center is different from the second data center.

Under an embodiment of the invention, the compute instance is at least one of a virtual machine, a container, and a bare metal server.

Under an embodiment of the invention, the method further includes storing, by the computing system, the network element data in the database.

In another aspect of the invention, a computer system for providing database-based redundancy in a telecommunication network includes a processor in the computer system and memory in communication with the processor, in which the memory includes instructions configured to cause the processor to perform any and/or all of the action set forth above.

Any of the above aspects and embodiments can be combined with other aspect and embodiments set forth herein and remain within the scope of the invention.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
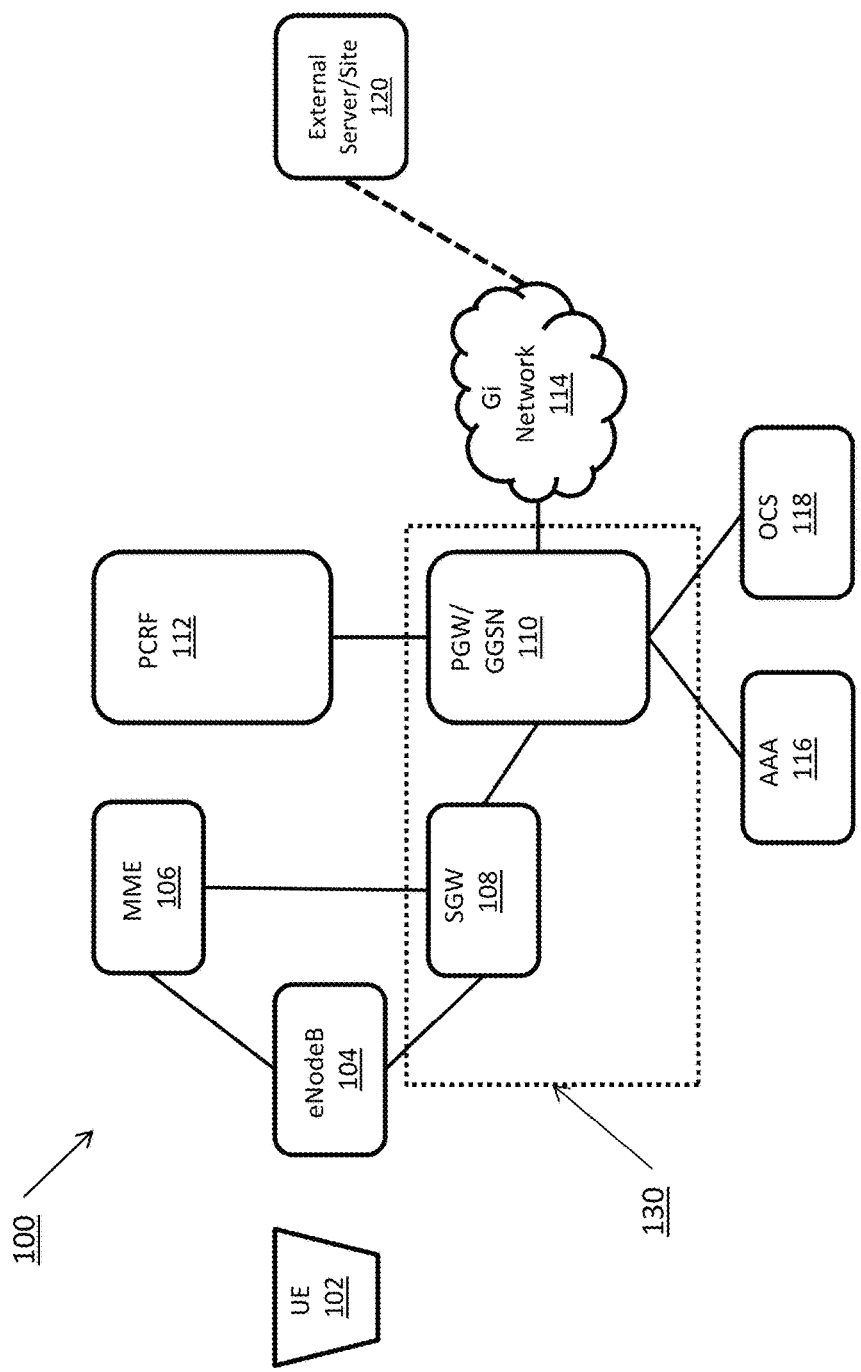
FIG. 1 is a system diagram showing a networked system, according to some embodiments of the present disclosure.

Currently, telco applications such as Gateway GPRS Support Node (GGSN), serving gateway (SGW), packet data network gateway (PGW), Trusted WLAN Access Gateway/Trusted WLAN Access Proxy (TWAG/TWAP), and Evolved Packet Data Gateway (ePDG), are built with internal stateful redundancy mechanisms. These mechanisms typically result in important dynamic information that relates to the current state of the specific protocol defined by 3GPP, IETF, ETSI, or other bodies during its processing of a subscriber or data flow, stored in at least 2 locations within a distributed system, such as 2 processes on 2 compute instances (e.g., virtual machines (VMs), 2 containers, or on 2 bare-metal servers). As used herein, embodiments that describe virtual machines can also apply equally to containers and bare-metal servers. Such dynamic state includes call state such as mobility location, as well as charging state (e.g., usage counters). Dynamic state can change extremely rapidly. For example, charging state can be updated on each and every packet processed on behalf of a subscriber. Even traditional memory-to-memory redundancy approaches rarely, if ever, perform internal state updates at this frequency and more typically resort to a time-based snapshot approach where the period of the snapshot update is based on the tolerance for inaccuracy in the replicated data. In some embodiments, inaccuracy results because of incomplete information due to lag.

Traditional memory-to-memory redundancy mechanisms are typically hand coded by the application developer and are therefore error prone, even to the point of increasing overall failure rates due to the increase in complexity to incorporate the redundancy scheme.

With the advent of network function virtualization (NFV), an expectation arises that systems are faster to create and deploy and simpler to operate. The flexibility of the virtualization infrastructure (hosts, switches, storage) adds additional redundancy, thereby creating the potential to simplify the approach taken with the telco applications.

Traditional SQL databases and other non-SQL databases offer relatively high transaction rates and high availability. Additionally, geographic redundancy through database replication is typically supported. Leveraging these properties with a modest tolerance for certain data loss (e.g., periodic updates of charging-related counters) allows for a drastic reduction in the complexity of telco application redundancy and the decrease of computational and memory requirements.

In some embodiments, eliminating the memory-to-memory synchronization can be accomplished by utilizing a database (e.g., an SQL or non-SQL database) to store redundant data. The database can be updated on an event driven basis (e.g., call establishment or handover), or for less critical state on a time driven basis (e.g., charging state to represent some incremental usage). Especially when the data center already has a high scale database deployed, the incremental cost to use the database for this purpose would be minimized. Upon failures, an agent in the system can reassign object ownership responsibility to the surviving members of the system cluster so that the stranded objects could be retrieved from the database and put back into service.

Through the use of geographic redundancy at the database level, the techniques described herein can also be used for multi-site redundancy. For example, if there are 3 active sites and one standby acting to benefit all 3, it would not be required to pre-stage 3 separate sets of VMs. In fact, it would be possible to pre-instantiate nothing until such time as a failure is recognized. Once the failure is recognized, a cluster of VMs is constructed, or a pre-built cluster is activated, and assigned responsibility to act on behalf of the failed site. Once done, the new cluster retrieves the appropriate state from the database and commences its ongoing duties.

In some embodiments, an important aspect of the techniques described herein is the speed at which a redundancy state can be read out of the database. While databases are very good at high speed concurrent read access, they can be greatly slowed when extensive relational searches are required to identify the correct subset of data to be read. In some embodiments, to maintain higher speeds of reading redundancy states out of the database, a database with a structured schema design is used.

In some embodiments, the techniques described herein relate to schema design. As described herein, the schema design lends itself to a no-SQL database implementation as well as SQL databases. No-SQL databases are optimized for fast write and bulk read. Typical no-SQL databases (e.g., Cassandra, Apache Geode) are clustered approaches that utilize only a single flat distribution key. No-SQL databases include in-memory databases (e.g., Apache Geode) and disk-based or persistent databases (e.g., Cassandra). All records with the same distribution key are written to the same server. For example, the techniques described herein include using a database table of mobile telephony session records that can uniquely identify each record by a 3-tuple {source-VM-ID, IMSI, creation-time}. Since only the most significant portion of the compound key is used for cluster distribution purposes, all sessions and associated data managed by the same VM within a clustered network element can be stored on the same server (e.g., Cassandra server, Apache server). If a VM fails and is re-created, the new instance of the VM can rapidly retrieve all of the state data deposited by its predecessor VM instance.

FIG. 1 is a system diagram showing a networked system 100, according to some embodiments of the present disclosure. System 100 includes user equipment 102, a server 104, and a network 106. System 100 includes a user equipment (UE) 102, evolved node B (eNodeB) 104, multimedia messaging service (MME) 106, serving gateway (SGW) module 108, packet data network gateway (PGW)/Gateway GPRS Support Node (GGSN) 110, policy and charging rules function (PCRF) 112, a gigabit wireless (Gi) network 114, Authentication, Authorization and Accounting (AAA) 116, online charging system (OCS) 118, external server/site 120, network element group 130.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 108. Backhaul is a process of transferring packets or communication signals over relatively long distances to a separate location for processing. SGW 108 routes and forwards user data packets, while also acting as the mobility anchor for a user plane during inter-eNodeB handovers. MME 106 is a control node in the networked system 100. MME 106 handles the LTE related control plane signaling that also includes mobility and security functions for UE 102 that attaches to the LTE Radio network. MME 106 also handles UE being in idle mode, including support for Tracking area management and paging procedures.

PGW/GGSN 110 is the point of interconnect between the mobile network and the external IP networks and handles policy enforcement, IP Address allocation and charging functions. PGW and GGSN serve similar functions and are used interchangeably herein in this disclosure for 3G, 4G and LTE networks. PCRF 112 (Policy and Charging Rules Function) interfaces with the PGW to provide PGW with the appropriate policies to enforce for each subscriber. Gi Network 114 is an Internet Protocol (IP) based network connecting the PGW with a packet data network or the Internet. Gi Network 114 connects to external servers or sites 120. AAA 116 is the Authentication, Authorization and Accounting server, providing authorization, policy enforcement and charging/accounting services for the PGW. OCS 118 is an online charging system that allows service providers to charge their customers based on the customers' real time usage of mobile services.

As depicted in FIG. 1, network element group 130 includes serving gateway (SGW) module 108 and packet data network gateway (PGW)/Gateway GPRS Support Node (GGSN) 110. Network element group 130 can be any one or combination of network elements or group of services determined by an operator (also referred to herein as a cluster). In some embodiments, network element group 130 is a geo-group (e.g., a set of network nodes and/or functions that are geographical co-located). The group of services can include SGW, PGW, GGSN, and/or ePDG. Services can also include web proxy, video/image transcoding, and packet inspection (DPI), Charging, QoS, VoLTE. The SGW/PGW can also be considered the session service for voice and data. Network element group 130 can also include service construct objects associated with the services, for example loopback IPs, UE IP sub-pools, Gx interface, Gy interface, Gz interface, AAA interface, GTP interface. As described in more detail below, a virtual machine (VM) can be associated with any individual service or portion of a service or a collection of services.

As described herein, the techniques described herein for using database based redundancy can apply to both clustered and non-clustered virtual network elements or virtual nodes (also referred to herein as virtualized network functions (VNFs)). A cluster includes a group of network elements or VMs such that there is internal coordination among the element members. Using a cluster generally tends to hide the internal workings or internal topology of the elements. That is, from the outside, a cluster is seen as a single network element. As used herein, clustering is also referred to as tight-coupled clustering. A non-clustered VNF includes network elements or VMs such that the topology or internal connections between the elements is not hidden.

Figure 2:
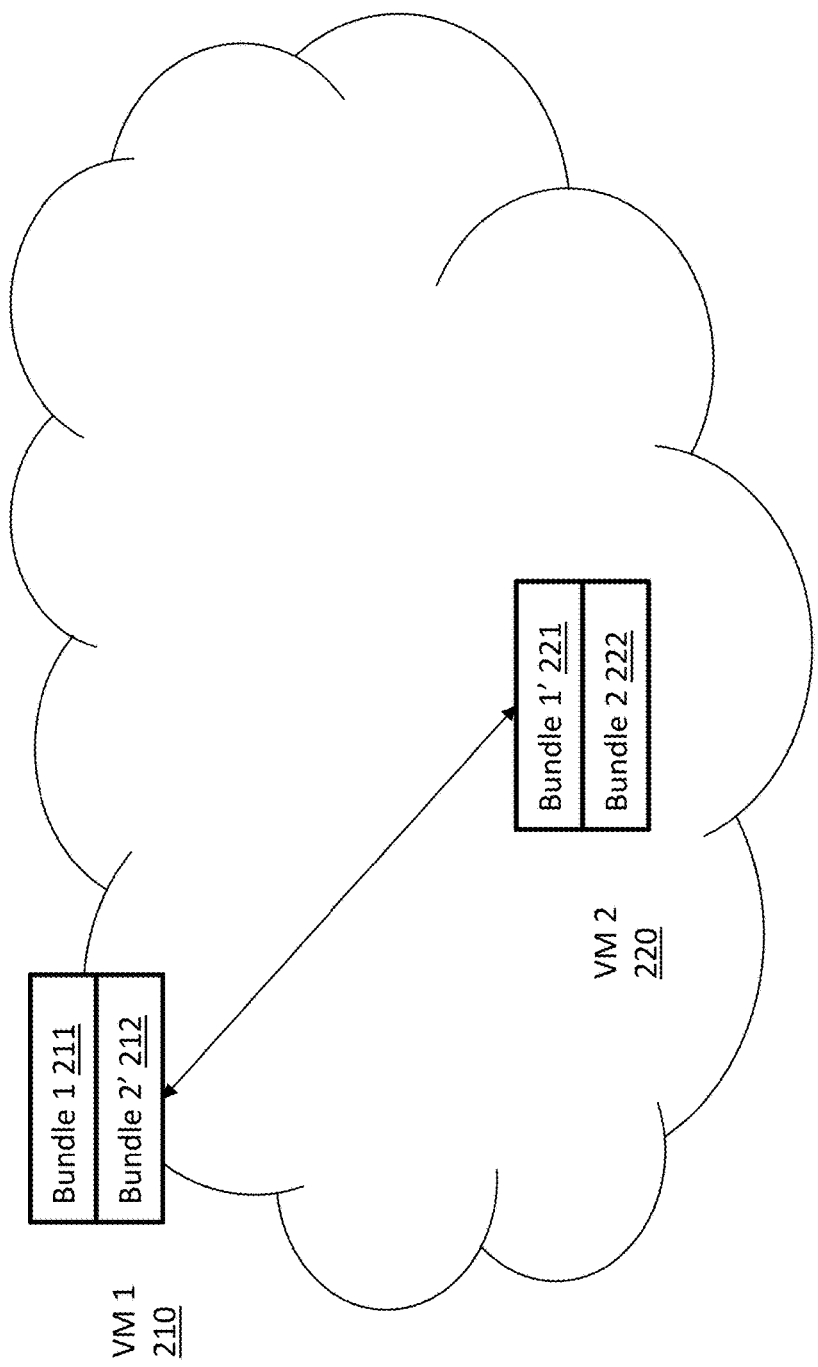
FIG. 2 is a system diagram showing a traditional method of achieving redundancy in network elements across virtual machines distributed throughout a telecommunications network.

FIG. 2 is a system diagram showing a traditional method of achieving redundancy of network elements across virtual machines distributed throughout a telecommunications network. FIG. 2 shows VM1 210 and VM2 220. VM1 includes primary bundle 1 211 and secondary bundle 2' 212. VM2 includes secondary bundle 1' 221 and primary bundle 2 222. As shown in FIG. 2, each virtual machine can have both a primary and a secondary bundle. In some embodiments, a first VM can be associated with only primary bundles and a second VM associated with only the corresponding secondary bundles.

Each of VM1 210 and VM2 220 include primary and secondary bundles (with secondary bundles denoted with (')). As referred to herein, a bundle refers to a collection of states associated with a network element (the data relevant to communication sessions). When VM1 210 fails, VM2 220 provides redundancy for bundle 1 and takes over from VM1 210 the responsibility of hosting bundle 1.

Figure 3:
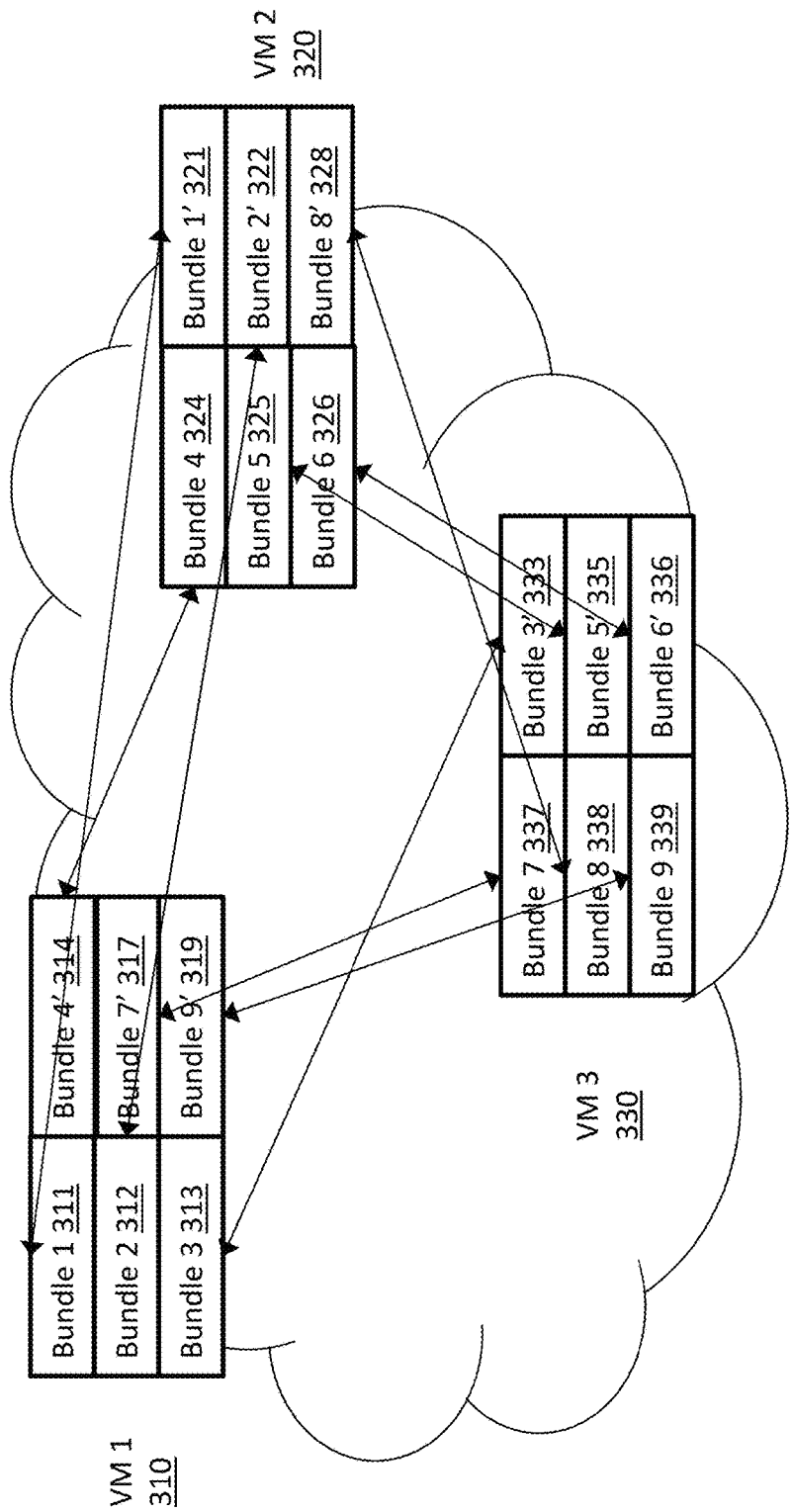
FIG. 3 is a system diagram showing a traditional method of achieving redundancy in network elements across virtual machines distributed throughout a telecommunications network.

FIG. 3 is a system diagram showing a traditional method of backing up network elements across virtual machines distributed throughout a telecommunications network. FIG. 3 shows VM1 310, VM2 320, and VM3 330. VM1 includes bundle 1 311, bundle 2 312, bundle 3 313, bundle 4' 314, bundle 7' 317, and bundle 9' 319. VM2 includes bundle 4 324, bundle 5 325, bundle 6 326, bundle 1' 321, bundle 2' 322, and bundle 8' 328. VM3 330 includes bundle 7 337, bundle 8 338, bundle 9 339, bundle 3' 333, bundle 5' 335, and bundle 6' 336.

Each of VM1 310, VM2 320, and VM3 330 include primary and secondary bundles (with secondary bundles denoted with (')). As described above, a bundle can refer to a collection of states associated with a network element. For example, VM1 310 includes primary instances of bundle 1 311, bundle 2 312, and bundle 3 313 and secondary instances of bundle 4' 314, bundle 7' 317, and bundle 9' 319. In some embodiments, each bundle has a role and a run-time state. The role can be primary or secondary and the run-time can be active or standby. In preferred embodiments, a primary bundle is associated with an active state and a secondary bundle is associated with a standby state. Even though secondary bundles are not always active, space is allocated on a VM for the secondary bundle in case operations are transferred from the primary bundle to the secondary bundle. As depicted in FIG. 3, bundles can be associated with one another to form a cluster on a VM. For example, bundle 1 311, bundle 2 312, bundle 3 313, bundle 4' 314, bundle 7' 317, and bundle 9' 319 on VM 1 310 can form a cluster.

As shown in FIG. 3, each of the primary bundles is associated with a secondary bundle located on a different virtual machine. Each set of primary bundles in a VM is also backed to more than one other VM. For example, bundle 1 311 and bundle 2 312 on VM1 310 are associated with bundle 1' 321 and bundle 2' 322 on VM2 320, respectively, while bundle 3 313 on VM1 310 is associated with bundle 3' 333 on VM3 330. Each of VM1 310, VM2 320, and VM3 330 can be located at the same site or at different geographic sites. When VM1 310, VM2 320, and VM3 330 are located at different geographic locations, backing up bundles across the different VMs is referred to as geographic redundancy.

Figure 4:
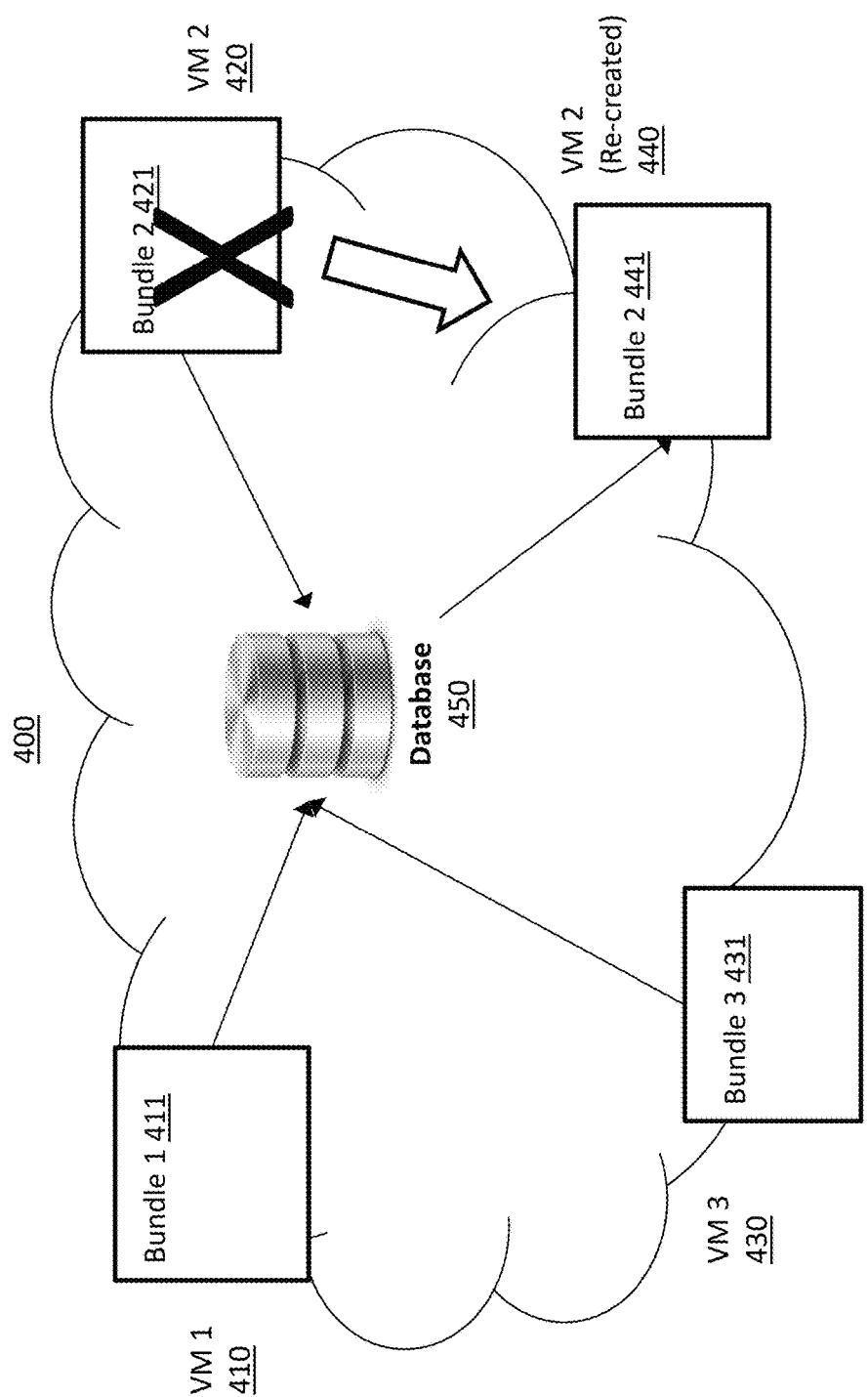
FIG. 4 is a system diagram showing a database based redundancy system in a single data center, as described in some embodiments of the present disclosure.

FIG. 4 is a system diagram showing a database based redundancy system in a single data center, as described in some embodiments of the present disclosure. FIG. 4 shows a data center 400 that includes VM 1 410, VM 2 420, VM 3 430, VM 2 (re-created) 440 and database 450. VM 1 410 is associated with bundle 1 411. VM 2 420 is associated bundle 2 421. VM 3 430 is associated with bundle 3 431. VM2 (re-created) 440 is associated with bundle 2 441.

Bundles and VMs depicted in FIG. 4 are similar to bundles and VMs described in FIGS. 2 and 3. As described above, database 450 can be any type of non-relational database using structured schema. In some embodiments database 450 can be implemented as a no-SQL database or an SQL database. No-SQL databases generally are optimized for fast write and bulk read. Typical no-SQL databases (e.g., Cassandra, Apache Geode) are horizontally scalable approaches that utilize only a single flat distribution key. No-SQL databases include in-memory databases (e.g., Apache Geode) and disk-based or persistent databases (e.g., Cassandra). As described in more detail below, database 450, in some embodiments, stores sessions as n-tuple strings (also referred to herein as composite keys) associated with session data, where n is greater than 1. Briefly, in some embodiments, the portion of the string associated with the most significant bits in the string provide identifier information for a source or primary VM, while the remainder of the string provides state or configuration information. For example, a bundle ID, VM ID, or node ID can be stored as the most significant bit(s) of a string. In some embodiments, database 450 maps all of the bundles to the same server. In some embodiments, a VM can own one or more "bundles" of state.

In some embodiments, writes from the primary bundles are streamed to database 450. The writes can include control plane events (e.g., PDN attach, mobility, paging, etc.) and state (e.g., charging state every 60 seconds), which can be periodic, fine-grained state information. In some embodiments, the writes can include any other event or information used to reconstitute the call and/or data connection into the state it was in prior to the failure such as counters and charging events.

Data center 400 can be any server or computer processing device. In some embodiments, data center 400 can include an orchestrator for facilitating communication between the database 450 and virtual machines 410, 420, 430, and 440. As described in more detail in the text accompanying FIG. 8, an orchestrator can be responsible for life cycle management, and be responsible for the failure detection and recovery processes described herein.

FIG. 4 shows using the techniques described herein to instantiate a new VM, new bundles within a VM, or transfer of bundles to an active VM. The database redundancy techniques described herein are equally applicable to clustered and non-clustered services. Each of bundle 1 411, bundle 2 421, and bundle 3 431, write associated control plane events and state, or any other event or information used to reconstitute the call or data session into the state it was in prior to the failure such as counters and charging events, to database 450. Associated with each of the written events and state is also identification information indicating a source bundle or VM associated with the written information. When VM2 420 fails, information from database 450 associated with VM2 420, which includes bundle 2 421, can be used to a re-create a version of VM2 440. That is, when VM2 420 fails and is re-created, the new instance of a VM 440 can rapidly retrieve from database 450 all state information and data deposited by its predecessor VM instance 420. Reads from database 450 tend to be infrequent (due to the relatively infrequent nature of failures) but are fast. Upon failure, a VM is recreated and assigned the failed VM's state responsibilities. A failure can be detected by a virtualized network function (VNF) through the use of heart beating mechanisms or any other failure detection techniques. Additionally, a failure can be detected by the virtualization layer through the use of heart beating mechanisms or any other failure detection techniques employed at that layer. Once a failure is detected, the virtualization layer can communicate with an orchestration layer to take a recovery action and recreate the VM in the same data center. In some embodiments, a simple schema approach enables a rapid read from database 450.

Figure 5:
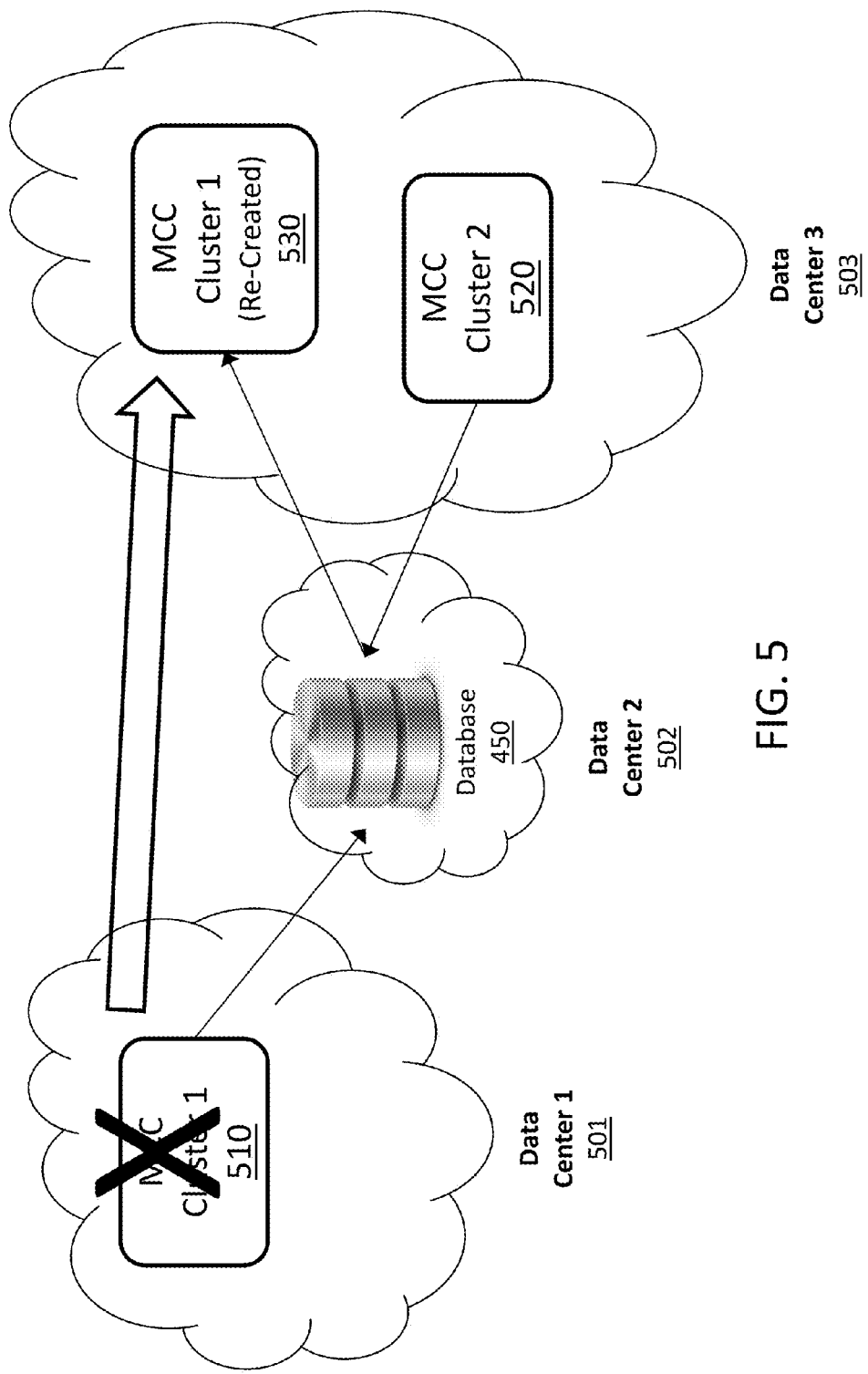
FIG. 5 is a system diagram showing a database based redundancy system used for clusters across multiple data centers, as described in some embodiments of the present disclosure.

FIG. 5 is a system diagram showing a database based redundancy system used for clusters across multiple data centers, as described in some embodiments of the present disclosure. FIG. 5 shows data center 1 501 including mobile content cloud (MCC) cluster 1 510, data center 2 502 including database 450, and data center 3 including MCC cluster 1 (re-created) 530 and MCC cluster 2 520.

In some embodiments, data center 1 501, data center 2, 502, and data center 3 503 can be located in different geographic locations. In some embodiments, data center 1 501, data center 2, 502, and data center 3 503 are located in the same location. As explained in more detail above in the text accompanying FIG. 4, data center 1 501, data center 2, 502, and data center 3 503 can be a server or any other computer processing device. MCC cluster refers to a collection of virtual machines (e.g., all of the virtual machines in FIG. 4 (minus the database 450)). MCC refers to a mobile content cloud, which is a virtualized network element that can include multiple network element functions (e.g., PGW, SGW, etc.). MCC cluster 1 510 and MCC cluster 2 520 write associated control plane events and state to database 450. Associated with each of the written control plane events and state is also identification information indicating a source cluster associated with the written information. When MCC cluster 1 510 fails at data center 1 501, information from database 450 recreates MCC cluster 530 at data center 3 503. As described in more detail below, data center 2, which hosts database 450, can include an orchestrating layer to detect the failure of MCC cluster 1 510, and identify another data center to replicate the data associated with the failed MCC cluster. In some embodiments, database 450 can also be backed up using known database redundancy techniques, and the database backup can also be co-located or geographically diverse.

Figure 6:
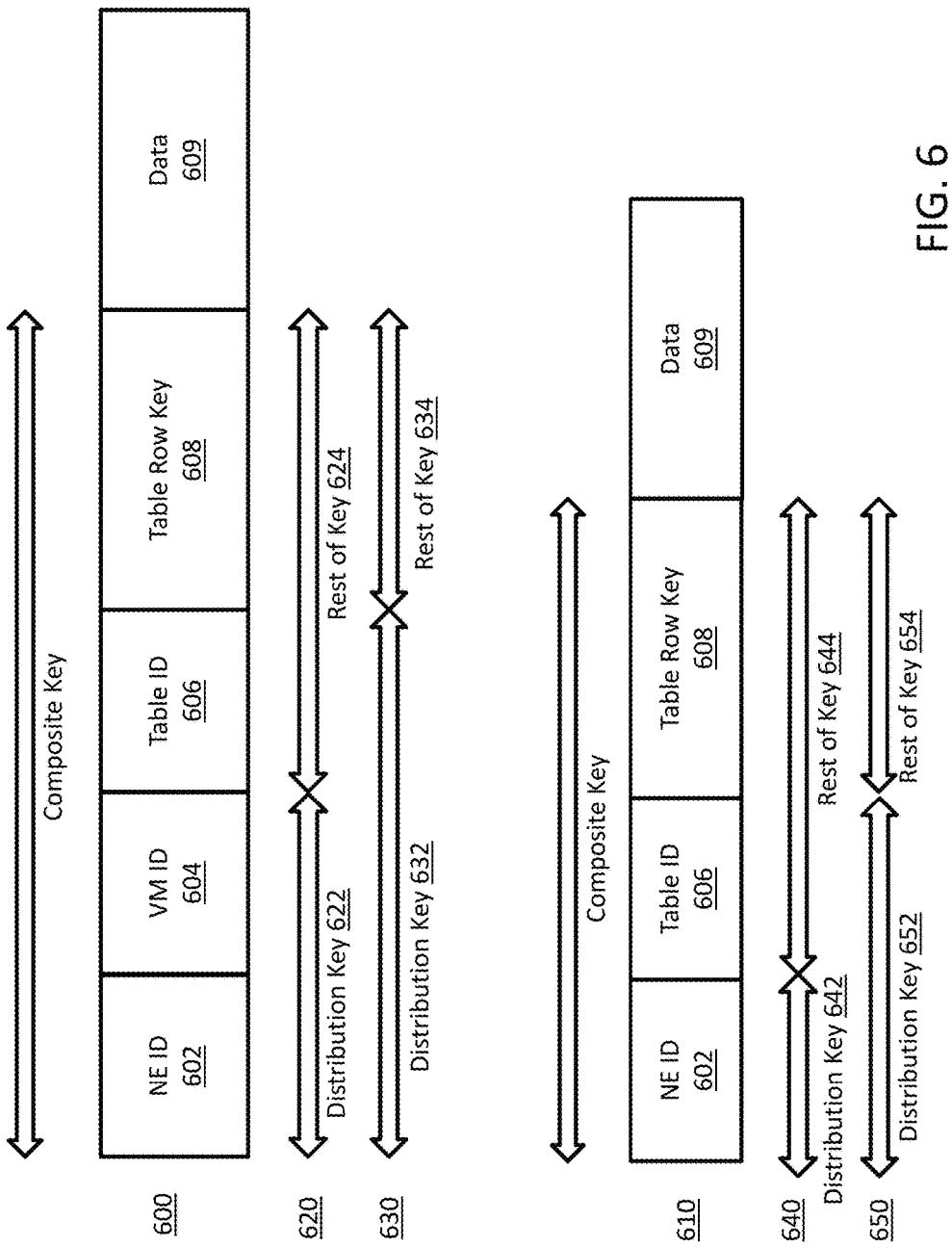
FIG. 6 is a diagram showing composite keys that are presented to a database, according to some embodiments of the present disclosure.

FIG. 6 is a diagram showing composite keys and associated data that are presented to a database and stored as records, according to some embodiments of the present disclosure. FIG. 6 shows a first composite key and data 600 and a second composite key and data 610. The first composite key and data 600 includes network element (NE) ID 602, VM ID 604, table ID 606, and table row key 608, and is associated with data 609 (e.g., the state data and information need to maintain an ongoing call and/or data session). The second composite key includes NE ID 602, table ID 604, and table row key 606 and is associated with data 609.

The first composite key and data 600 represents a composite key for a clustered network element according to some embodiments. The left most significant portion of the composite key includes a network element ID 602. Network element ID 602 can include a number of bits associated with a particular network element, such as any of the network elements described in FIG. 1 (e.g., multimedia messaging service (MME) 106, serving gateway (SGW) module 108, packet data network gateway (PGW)/Gateway GPRS Support Node (GGSN) 110, policy and charging rules function (PCRF) 112, Authentication, Authorization and Accounting (AAA) 116, and online charging system (OCS) 118). VM ID 604 can include a next number of bits after the number of bits associated with network element ID 602, which is associated with a particular VM that hosts the particular network element. For example, one virtual machine can host several of network elements. A network element can also be hosted on several, or a cluster, of virtual machines. Within a network, there can be multiple cluster nodes, as illustrated for example in FIG. 5. In some embodiments, the cluster ID 604 identifies a VM. The next most significant number of bits after the VM ID 604 bit(s) are associated with table ID 606. Table ID 606 refers to an ID of a table holding event information. Each table ID can hold a different type of event information. For example, table id 1 can hold states of type A that arose from events of type A, while table id 2 can hold states of type B that arose from events of type B. For example, an event can be a network attachment request from a UE. When the system processes the event, it can generate state information (i.e., data 609) associated with the event. For example, part of the processing for a network attachment can include the following state data: authorization of the UE, allocation of an IP address, and a look up of a policy set identifier to apply to the traffic. Each of these states data values can be stored in one row of a table or could be stored in multiple rows of multiple tables. The next most significant number of bits after the table ID 606 are associated with table row key 608. Table row key 608 is a unique identifier for any given row of that type as owned by that network element and VM (if clustered). For example, as described above, each of the tables represented by a table ID 606 can include multiple rows. A table row key 608 can provide an index identifying a row in the table. For example, each row could correspond to a different subscriber, and a table row key 608 can identify the subscriber. In some embodiments, a row can be associated with multiple table row keys 608. In some embodiments, a row is associated with a unique table row key 608. For example, a table row key 608 can be associated with an IMSI and a user can be associated either a unique IMSI or multiple IMSIs. As another example, a table row key 608 can be associated with an IP address and a user can be associated either a unique IP address or multiple IP addresses.

The second composite key portion of 610 represents a composite key for a non-clustered network element according to some embodiments. A non-clustered network element, for example, can be a virtual machine hosting one network element. The arrangement of bits in the second composite key portion of 610 is similar to the first composite key portion in 600, except the second composite key portion of 610 does not contain a number of bits associated with VM ID 604.

The first and second composite keys can be further divided into a distribution key 622, 632, 642, and 652 and the rest of the key 624, 634, 644, 654—each record including a data portion 609. Distribution key 622, 632, 642, and 652 includes a subset of the most significant fields (i.e., those on the left) within the composite key. The distribution key 622, 632, 642, or 652 can be used for internal balancing within the database. For example, all rows that share the same distribution key can be stored on the same storage node (i.e., server) within the cluster of servers comprising the database. The selection of a distribution key can be made to best exploit the access pattern observed at the database when used for redundancy of a telecommunications system. Such a database can observe a constant and typically high rate of writes (i.e., create, update, delete) and no reads unless a failure occurs. Upon failure of a VM, a replacement VM is constructed and is then instructed to retrieve all of the rows that were owned by its predecessor. The data 609 associated with the retrieved rows is used to construct the failed instance on the new or pre-existing replacement instance. As described in more detail below, an orchestrating layer and virtualization layer (also referred to herein as a computing device) can be in communication with the virtual machines and the database, and can detect the failure of a virtual machine and send instructions to another virtual machine to take over the state information of the failed virtual machine. When working with a database using physical drives, this set of reads has been shown to be fastest when the rows are not distributed amongst the entire set of servers comprising the database (e.g., thereby avoiding disk seek time and communications overhead), but rather when a single server within the distributed database provides all of the records. Distribution keys 622 and 642 illustrate such a design. In some databases, however, a variation of distribution key 622 is thought to be more effective. In this variation (e.g., distribution keys 632 and 652), all of the records for a given table type are read from a single server while other table types are read from other servers in parallel. Such a design is best employed when the database storage does not use physical drives (e.g., records held in memory, solid state storage, etc.)

One example of data 609 contained within a record of table ID 606 and table row key 608 is a current state of a call. When this call state information is associated with a first virtual machine that fails, the call state information can immediately be transferred to a second virtual machine without dropping the call. When the first virtual machine is active, a telecommunications application managing the network writes state information data to a database. The state information data is associated with a network element ID (and VM ID, if applicable). When the first virtual machine fails, the state information data is transferred by the orchestration layer and the virtualization layer, as described in more detail below, from the database to the second virtual machine by transferring all data in the database associated with the network element ID (and VM ID, if applicable). In some embodiments, transferring or writing the data to the second virtual machine effectively assigns the second virtual machine the same identity of the first virtual machine, including the VM ID 604 of the first virtual machine.

Figure 7:
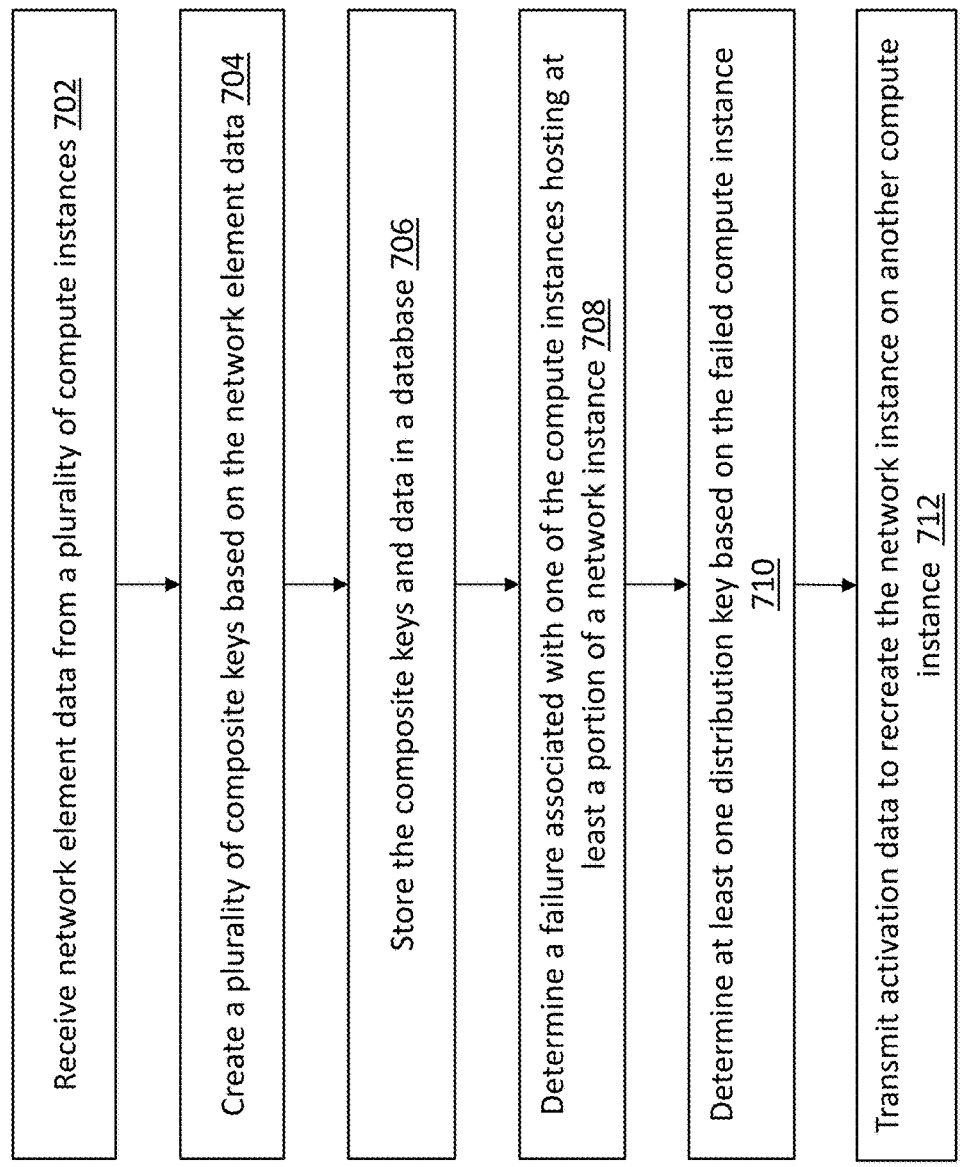
FIG. 7 is a flowchart showing database-based redundancy of a network element, according to some embodiments of the present disclosure.

FIG. 7 is a flowchart showing database-based backup of a network element, according to some embodiments of the present disclosure.

Referring to step 702, network element data is received from a plurality of compute instances. Compute instances can include virtual machines, containers or bare metal servers. In some embodiments, bare metal servers refer to physical servers. As described in more detail above, each of the compute instances can host a network element instance or a portion of a network element instance. The network element data can include network element identification information and state information associated with the network element.

Referring to step 704, a plurality of composite keys are created based on the network element data. In some embodiments, the network element data that is received from the compute instances is stored in the database (or another data structure), and the composite keys are created based on the stored network element data. Each compute instance can be associated with network element identification information and state information data for one or more network elements. In some embodiments, a composite key can be created based on the network element identification information and state information data for one or more network elements. The composite key can include a network element identifier (ID) based on the network element identification information. For example, each of network elements PGW, SGW, GGSN and/or PCRF can be hosted as a separate instance on a different compute instance or over multiple compute instances, and each of the same network elements can be associated with a different network element ID. In some embodiments, each of the network elements can also be associated with a table ID. As described above, the table ID can be associated with the network element ID. The table ID can indicate a category of state information associated with the network element instance. In some embodiments, categories of state information data can include, for example, attached user sessions, access bearers associated with attached user sessions, and active 5-tuple flows associated with radio access bearers. In some embodiments, the composite key can also include a table row key and a cluster node ID.

Referring to step 706, the created composite keys and associated data are stored in a database as records (e.g., a plurality of rows). In some embodiments, each composite key and associated data is stored as a separate row. As described above in more detail, a data center can host one or more of the compute instances and the database. In some embodiments, the database is hosted separately from the compute instances. In some embodiments, the data center includes both the database and the compute instances.

Referring to step 708, a failure associated with one of the compute instances is determined. In some embodiments, the failed compute instance includes least a portion of a network element instance. As described above in more detail, failure of a first compute instance can be detected using heart beating mechanisms or any other failure detection techniques. In some embodiments, a data center, or specifically an orchestrator and network function virtualization infrastructure within the data center, can detect the failure of the compute instance.

Referring to step 710, at least one distribution key is determined based on the failed compute instance. As described above, a distribution key can include a subset of the most significant fields (i.e., those on the left) within the composite key. In some embodiments, each of the distribution keys include a network element ID associated with the network element instance associated with the failed compute instance.

Referring to step 712, instructions (e.g., an activation command) are transmitted to another compute instance to recreate the network instance on another compute instance. In some embodiments, the compute instance where the network instance is recreated already exists in the network. In some embodiments, the compute instance where the network instance is recreated is created to host the network instance. In some embodiments, instructions are transmitted to another compute instance that instruct the other compute instance to retrieve from the database a complete set of rows for all tables associated with the failed compute instance. In some embodiments, the rows can be identified by the distribution keys. As described in more detail above, a second compute instance can rapidly retrieve from the database all the state data deposited by the first compute instance.

Figure 8:
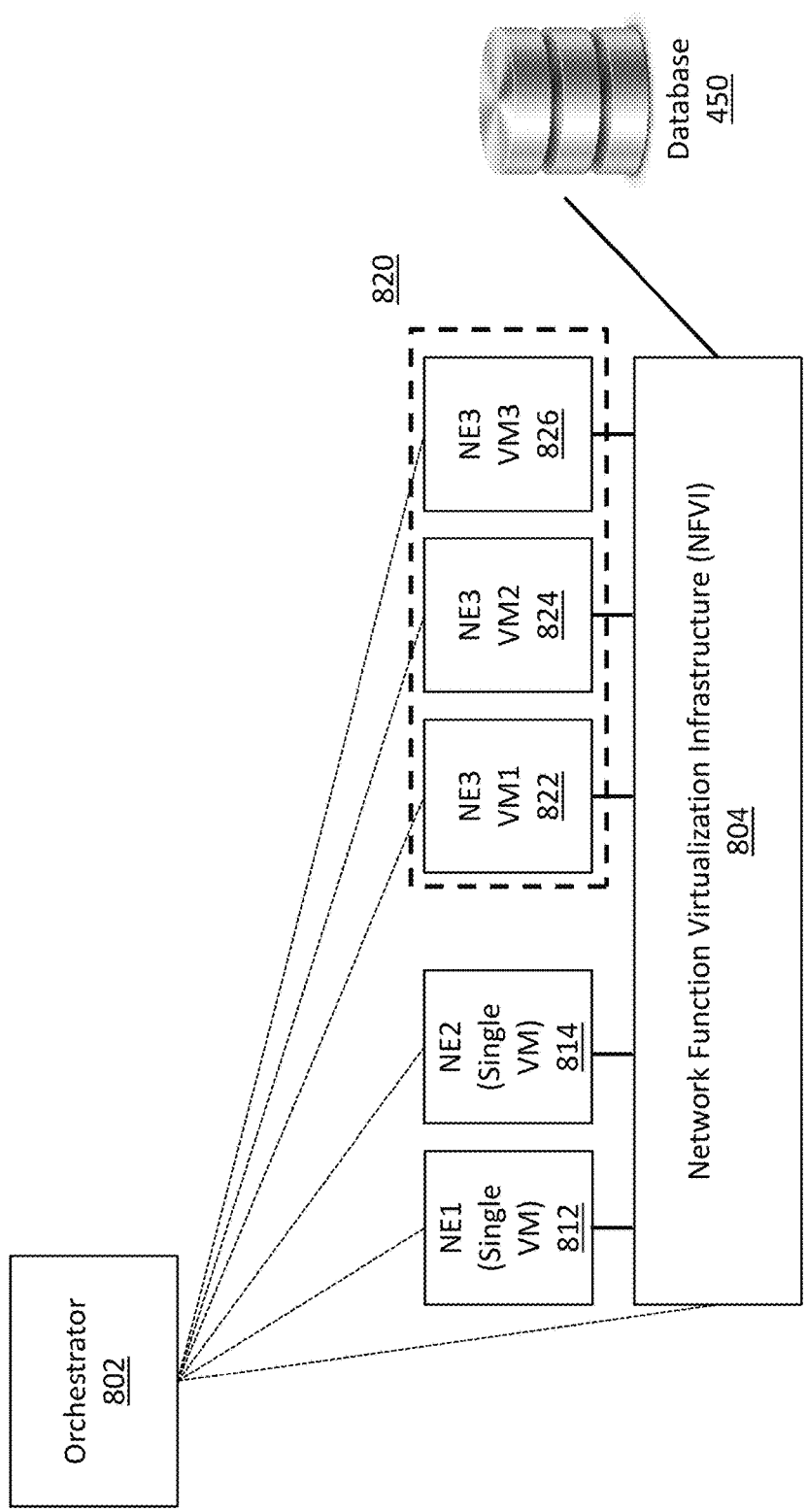
FIG. 8 is a system diagram showing an orchestrator and network function virtualization infrastructure, according to some embodiments of the present disclosure.

FIG. 8 is a system diagram showing an orchestrator and network function virtualization infrastructure, according to some embodiments of the present disclosure. FIG. 8 shows orchestrator 802, network function virtualization infrastructure (NFVI), network element 1 hosted on a single VM 812, network element 2 hosted on a single VM 814, network element 3 hosted on multiple VMs 822 824 826 in a cluster 820.

Orchestrator 802 in conjunction with NFVI 804 can detect a failure associated with a virtual machine and take a recovery action and recreate the failed VM on another VM in the environment. Orchestrator 802 and NFVI 804 can replicate a single VM (e.g., 812) to another single VM (e.g., 814), or a replicate a VM cluster (e.g., 820). As described in more detail above, a VM can be replicated by pulling relevant information associated with a failed VM from the database 450. Orchestrator 802 and NFVI 804 can be implemented as software operating on and/or coupled with a combination of servers, storage, networking switches & routers. For non-virtualized environments consisting of servers, storage, and networking elements, embodiments of the orchestration function (i.e., which detects and reacts to failures) may be contained in Element Management Systems (EMS), Network Management Systems (NMS), Operational Support Systems (OSS) or other software systems associated with monitoring of the network elements Benefits of the techniques described herein include a reduction in application complexity, reduction in data center complexity, reduction in footprint, and multi-site and geographic redundancy. Application complexity can be reduced because of the state-less nature of the application. In contrast, state backup schemes using traditional methods can require extensive code development and may introduce bugs. Data center complexity is also reduced because the VM restart is cold. That is, there is no virtualized infrastructure (VIM)-layer high availability (VIM-layer HA) requirement, and no heavy storage area network (SAN) requirement. Footprint is also reduced because VMs can be replaced on demand. Multi-site and geographic redundancy is also enabled because database redundancy can be leveraged for a multi-site synchronization or to recreate an entire cluster in a new data center on demand.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method for providing database-based redundancy in a telecommunications network, the computerized method comprising:
   receiving, by a computing system, network element data from a first compute instance, the first compute instance hosting at least a portion of a network element instance, the network element data including identification information and state information associated with the network element instance;
   creating, by the computing system, a composite key based on the network element data, the composite key including:
      a network element identifier (ID), the network element ID associated with the identification information, and
      a table ID associated with a categorization of the state information;
   storing, by the computing device, the composite key and associated state information as records in a database associated with the computing device;
   determining, by the computing system, a failure associated with the first compute instance;
   determining, by the computing system, a distribution key associated with the network element ID associated with the network element instance; and
   transmitting, by the computing system, activation data to a second compute instance, the activation data associated with instructions to retrieve, from the database, records associated with the distribution key associated with the first network ID including state information to recreate the first network element instance on the second compute instance.

2. The computerized method of claim 1, further comprising transmitting, by the computing system, write request data to the compute instance, the write request data associated with instructions to write the network element data to a database.

3. The computerized method of claim 1, wherein the composite key further includes at least one of:
   a table row key, the table row key associated with the state information corresponding to the table ID and the network element ID; and
   a compute instance ID, the compute instance ID associated with a compute instance hosting the network element instance.

4. The computerized method of claim 3, wherein the distribution key further includes at least one of a virtual machine ID and a table ID.

5. The computerized method of claim 1, wherein the computing system and the compute instance are located in a first data center.

6. The computerized method of claim 1, wherein the computing system is located in a first data center and the compute instance is located in a second data center, the first data center being different from the second data center.

7. The computerized method of claim 1, wherein the compute instance is at least one of a virtual machine, a container, and a bare metal server.

8. The computerized method of claim 1, further comprising storing, by the computing system, the network element data in the database.

9. A computer system for providing database-based redundancy in a telecommunication network, the system comprising:
- a processor in the computer system;
- a memory in communication with the processor, the memory including instructions configured to cause the processor to:
  - receive network element data from a first compute instance, the first compute instance hosting at least a portion of a network element instance, the network element data including identification information and state information associated with the network element instance;
  - create a composite key based on the network element data, the composite key including:
    - a network element identifier (ID), the network element ID associated with the identification information, and
    - a table ID associated with a categorization of the state information;
  - store the composite key and associated state information as records in a database;
  - determine a failure associated with the first compute instance;
  - determine a distribution key associated with the network element ID associated with the network element instance; and
  - transmit activation data to a second compute instance, the activation data associated with instructions to retrieve, from the database, records associated with the distribution key associated with the first network ID including state information to recreate the first network element instance on the second compute instance.

10. The system of claim 9, the memory further including instructions configured to cause the processor to write request data to the compute instance, the write request data associated with instructions to write the network element data to a database.

11. The system of claim 9, wherein the composite key further includes at least one of:
- a table row key, the table row key associated with the state information corresponding to the table ID and the network element ID; and
- a compute instance ID, the compute instance ID associated with a compute instance hosting the network element instance.

12. The system of claim 11, wherein the distribution key further includes at least one of a virtual machine ID and a table ID.

13. The system of claim 9, wherein the computer system and the compute instance are located in a first data center.

14. The system of claim 9, wherein the computer system is located in a first data center and the compute instance is located in a second data center, the first data center being different from the second data center.

15. The system of claim 9, wherein the compute instance is at least one of a virtual machine, a container, and a bare metal server.

16. The system of claim 9, further comprising storing, by the computer system, the network element data in the database.

* * * * *

UNITED STATES PATENT AND TRADEMARK OFFICE
CERTIFICATE OF CORRECTION

PATENT NO. : 10,154,087 B2  
APPLICATION NO. : 15/405505  
DATED : December 11, 2018  
INVENTOR(S) : Ronald M. Parker et al.

Page 1 of 1

It is certified that error appears in the above-identified patent and that said Letters Patent is hereby corrected as shown below:

On the Title Page

Item (72), please correct the Inventor Names to read as:  
Ronald M. Parker, Boxborough, MA (US);  
James J. Logan, Westborough, MA (US)

Signed and Sealed this  
Eighteenth Day of June, 2019

Andrei Iancu  
*Director of the United States Patent and Trademark Office*